United States Patent [19]

Baxter et al.

[11] Patent Number: 4,838,566
[45] Date of Patent: Jun. 13, 1989

[54] SLIDER

[75] Inventors: Bobby G. Baxter; Wendell B. Curtman, both of Warrenton; Michael W. Peveler, Montgomery City, all of Mo.

[73] Assignee: The Binkley Company, Warrenton, Mo.

[21] Appl. No.: 217,153

[22] Filed: Jul. 11, 1988

[51] Int. Cl.$^4$ .............................................. B60G 5/06
[52] U.S. Cl. ................................... 280/149.2; 180/209
[58] Field of Search ....................... 280/80 B; 180/209

[56] References Cited

U.S. PATENT DOCUMENTS

| | | | |
|---|---|---|---|
| 2,818,272 | 12/1957 | DeLay | 280/80 B |
| 3,096,993 | 7/1963 | McKay | 280/80 B |
| 3,146,000 | 8/1964 | Holzman | 280/80 B |
| 3,372,946 | 3/1968 | Hutchens | 280/80 B |
| 4,273,347 | 6/1981 | Hulse | 280/80 B |

Primary Examiner—Kenneth R. Rice
Attorney, Agent, or Firm—Senniger, Powers, Leavitt and Roedel

[57] ABSTRACT

A slider for adjustment of the suspension of a vehicle longitudinally with respect to the body of the vehicle, the slider comprising a pair of side rails, a frame adapted to carry the suspension slidable longitudinally of the body on the side rails, and a plurality of locking pins for locking the frame in various positions of adjustment relative to the side rails. The slider further comprises apparatus for retracting said locking pins including linkage interconnecting said pins for conjoint movement of the pins between extended and retracted positions. The linkage includes a shaft extending longitudinally of the frame, a crank for rotating the shaft, and a plurality of links interconnecting the shaft and the locking pins so that rotating the shaft retracts and extend the pins. A pull rod connected to the crank is manually movable from a first position to a second position for rotating the crank to rotate the shaft. A spring is connected at one end to the shaft and at the other end to the crank so that if one or more of the locking pins is stuck in extended position the spring deflects to permit the pull rod to move from its first position to its second position and turn the crank while the spring urges the shaft to rotate to retract the locking pins. The pull rod can be secured in its second position so that the spring continues to urge the shaft to rotate to retract the pins.

19 Claims, 5 Drawing Sheets

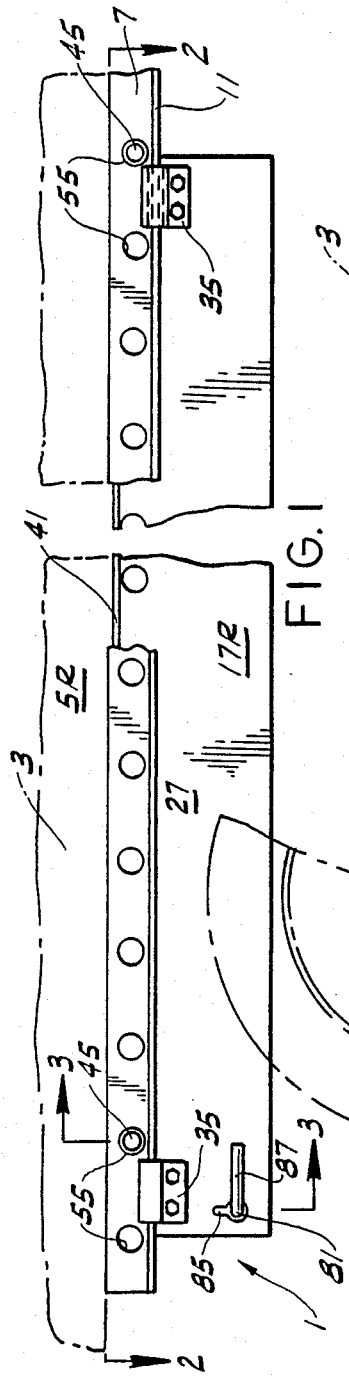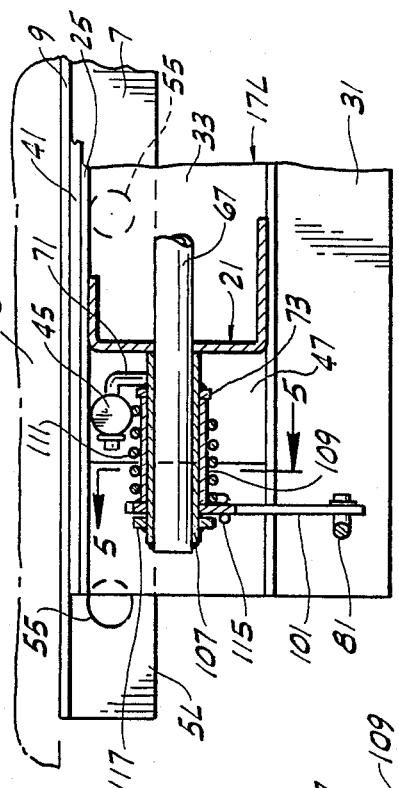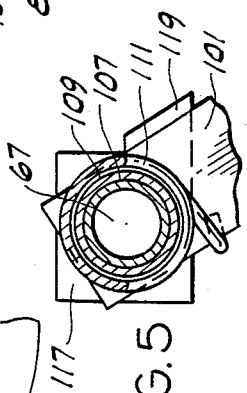

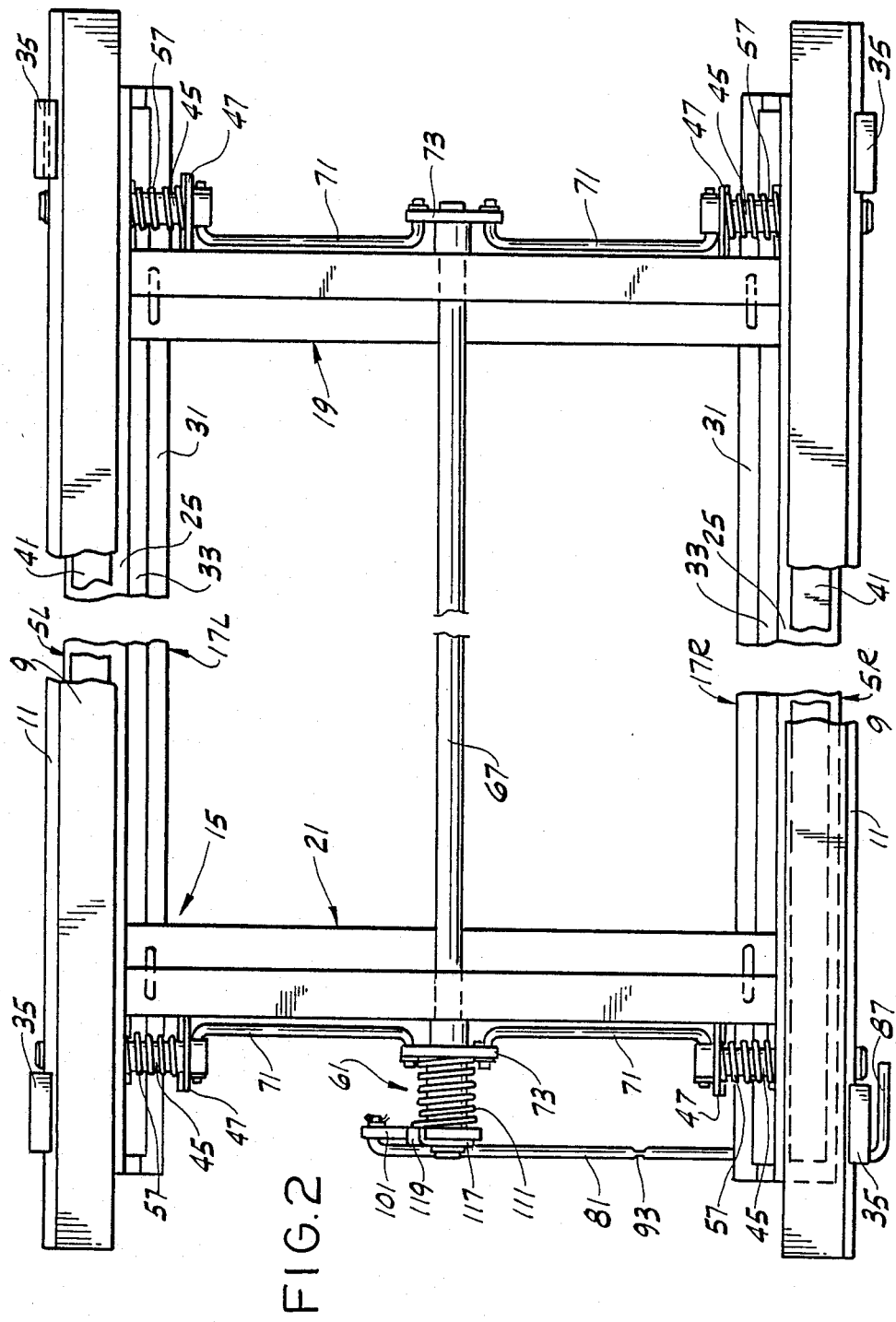

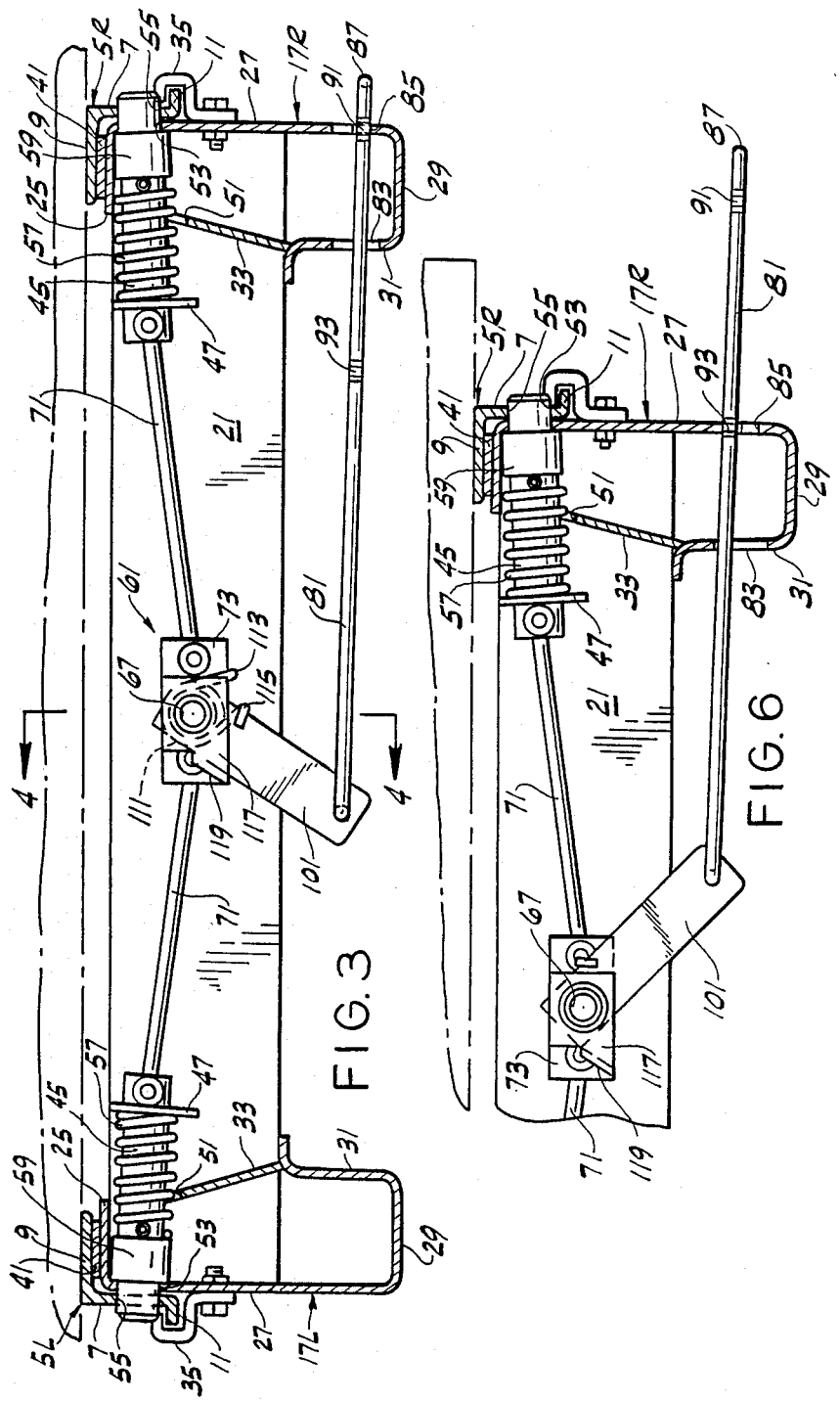

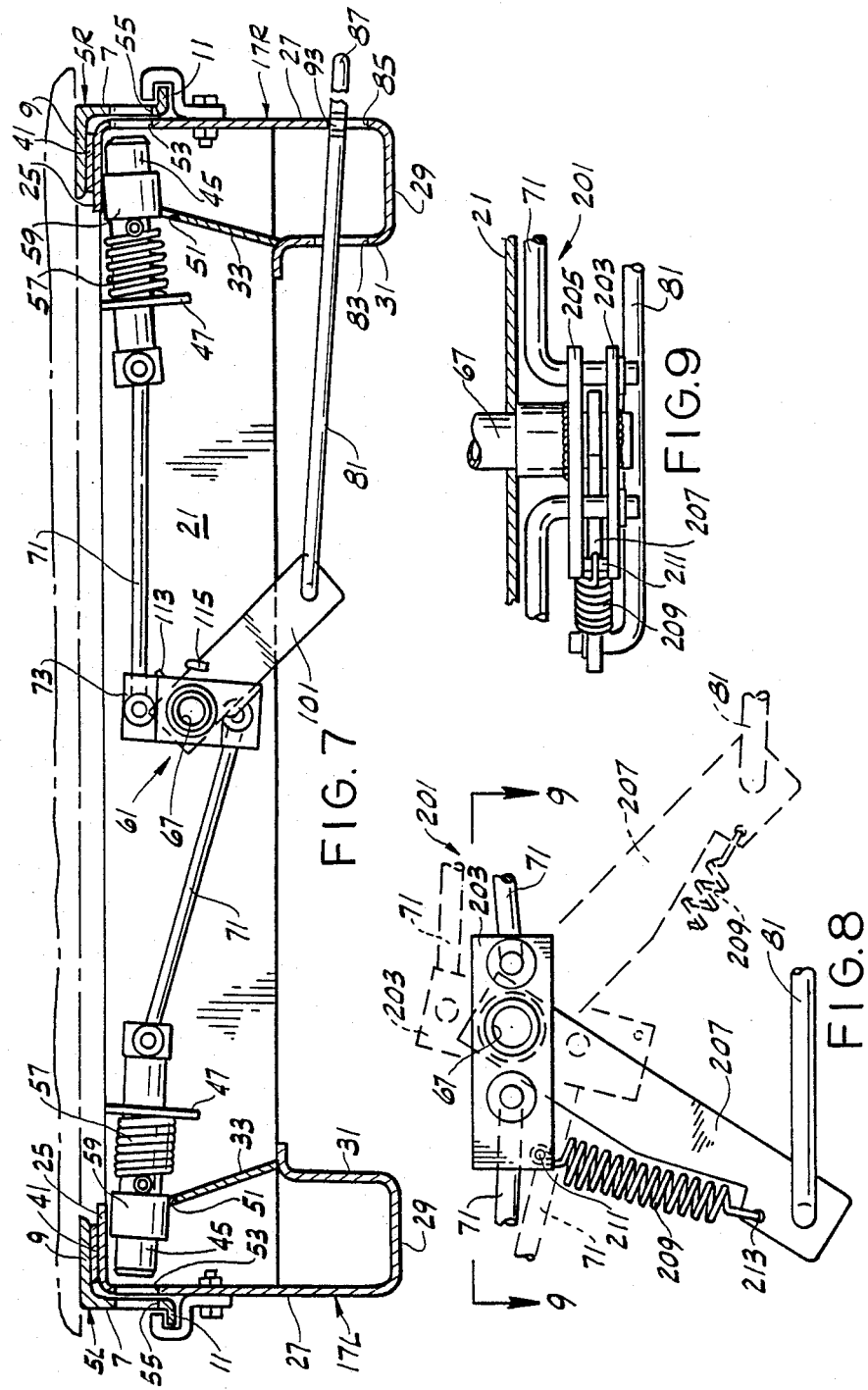

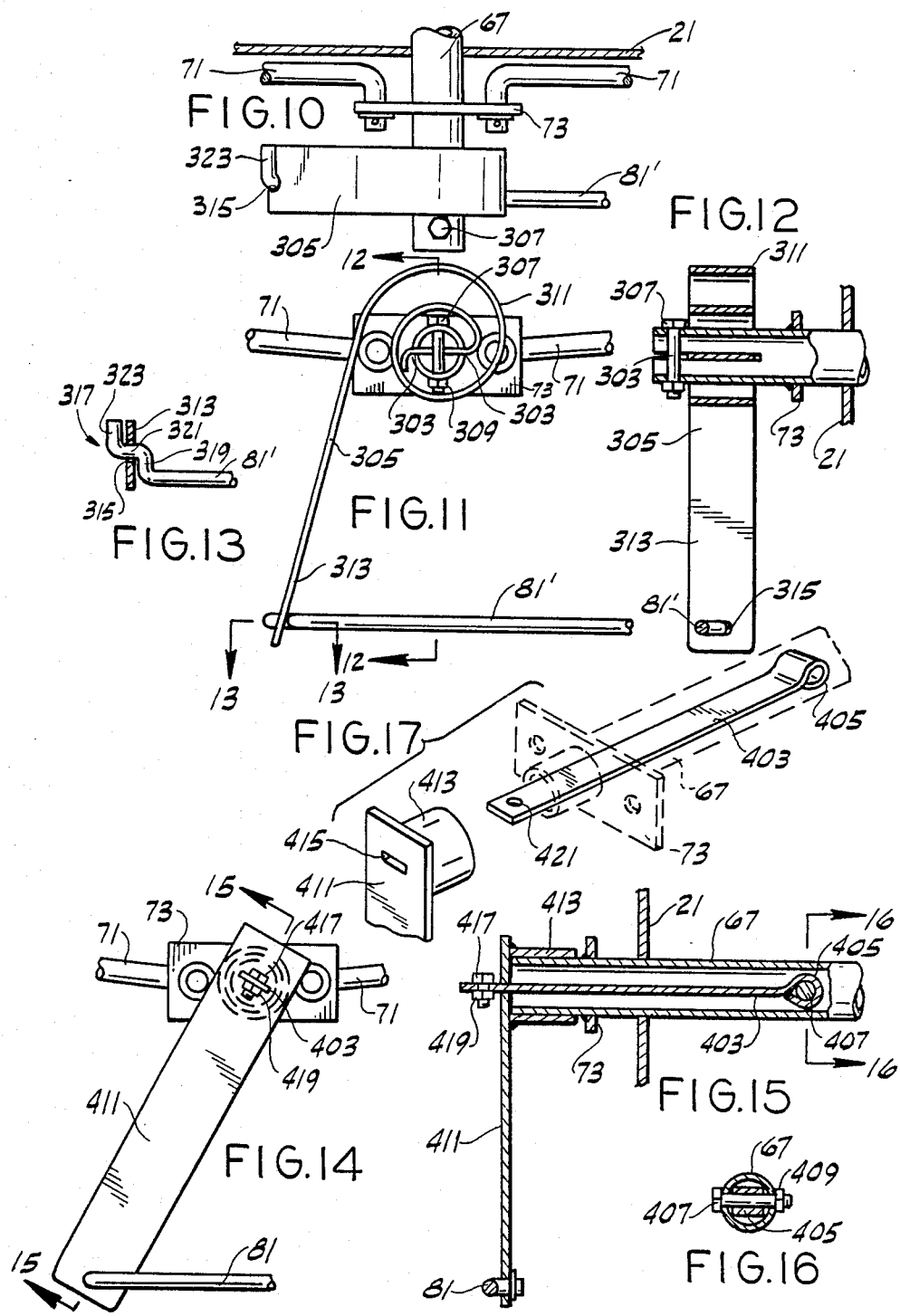

SLIDER

BACKGROUND OF THE INVENTION

This invention relates generally to sliders for adjustment of the suspension of a vehicle longitudinally with respect to the body of the vehicle and, more particularly, to apparatus for facilitating such adjustment.

This invention is especially concerned with sliders which enable adjustment of the suspension of a tandem axle trailer longitudinally relative to the van of the trailer. Conventional sliders used for this purpose typically comprise a pair of side rails secured at the left and right sides of the van in fixed position extending longitudinally of the van, and a frame which carries the suspension comprising left and right slide members slidable longitudinally of the van on the side rails. A plurality of locking pins lock the frame in various positions of adjustment relative to the side rails, the locking pins being retractible for permitting adjustment of the frame to a selected position of adjustment and extensible for locking the frame in the selected position of adjustment. The locking pins are connected for conjoint movement between extended and retracted positions by linkage, and the pins are normally urged to their extended position by a plurality of springs. The linkage is operable to retract the pins by a pull rod extending laterally outwardly at one side of the slider frame.

While the pull rod design described above has been used for years, it has a serious drawback. This is due to the fact that the locking pins often become stuck in extended position (due to the pins becoming wedged in openings in the slider frame, for example), thus making it difficult if not impossible to operate the pull rod to retract the pins. In this event, the operator of the vehicle typically tries to jog the trailer (drive it forward and/or rearward in short spurts) until the pins are sufficiently freed to enable the pull rod to be operated. This is inconvenient and time consuming, especially if there is only one person operating the vehicle, since there is no indication while jogging the trailer as to when the pins are in fact free. Thus, after jogging the trailer the operator may find that the pins are still stuck, necessitating that the entire procedure be repeated. One solution to this problem is to have a second person pull on the pull rod while the trailer is being jogged, so that the pins will retract as soon as they become free. However, a second person is not always available. And even if a second person is available, grasping and pulling the handle while the vehicle is moving poses a risk of injury.

SUMMARY OF THE INVENTION

Among the several objects of this invention may be noted the provision of improved apparatus for retracting the locking pins of a slider to permit adjustment of the suspension of a vehicle longitudinally of the body of the vehicle; the provision of such apparatus which serves as the "second person" discussed above without actually requiring the use of a second person; the provision of such apparatus which is safe to operate; and the provision of such apparatus which is economical to manufacture. Other objects and features will be in part apparent and in part pointed out hereinafter.

Briefly, the present invention is an improvement on the slider of the type mentioned above in having means for retracting the locking pins comprising linkage interconnecting the locking pins for conjoint movement of the pins between extended and retracted positions, said linkage including shaft means extending longitudinally of the frame, a crank for rotating said shaft means, and a plurality of links interconnecting said shaft means and the locking pins whereby rotation of the shaft means in one direction effects retraction of the locking pins and rotation of the shaft means in the opposite direction effects extension of the locking pins, an actuating member connected to said crank manually movable from a first position to a second position for rotating the crank to rotate the shaft means in said one direction to retract the locking pins, spring means connected at one end to means rigidly secured to the shaft means and connected at the other end to the crank, the arrangement being such that in the event one or more of the locking pins are stuck in extended position the spring means is adapted to deflect to permit movement of the actuating member from said first position to said second position and rotation of the crank in said one direction while urging rotation of said shaft means to retract the locking pins, and means for securing the actuating member in said second position while said spring means is deflected thereby to maintain a force urging the shaft means to rotate to urge the locking pins toward their retracted position.

BRIEF DESCRIPTION OF THE DRAWINGS

FIG. 1 is a partial right side elevation of a vehicle incorporating a first embodiment of a slider of this invention;

FIG. 2 is a top plan view of the slider taken along the plane of line 2—2 in FIG. 1;

FIG. 3 is a transverse cross-sectional view of the vehicle along the plane of line 3—3 in FIG. 1, showing the slider in rear end elevation with its locking pins extended;

FIG. 4 is a partial longitudinal cross-sectional view of the slider taken along the plane of line 4—4 in FIG. 3, showing the shaft for operating the pins;

FIG. 5 is a partial transverse cross-sectional view of the slider taken along the plane of line 5—5 in FIG. 4, through the shaft;

FIG. 6 is a partial rear end elevation of the slider, with the pull rod shown in the second position but the pins stuck in their extended position;

FIG. 7 is a rear end elevation of the slider, with the pull rod shown in its second position and the pins in their retracted position;

FIG. 8 is a partial rear end elevation of a second embodiment of a slider of this invention;

FIG. 9 is a partial top plan view of the slider taken along the plane of line 9—9 in FIG. 8;

FIG. 10 is a partial top plan view of a third embodiment of a slider of this invention;

FIG. 11 is a partial rear end elevation of the slider of FIG. 10;

FIG. 12 is a partial longitudinal cross-sectional view of the slider taken along the plane of line 12—12 in FIG. 11, showing the connection of the spring to the shaft;

FIG. 13 is a partial cross-sectional view of the slider taken along the plane of 13—13 in FIG. 11, showing the connection between the crank arm of the spring and the pull rod;

FIG. 14 is a partial rear end elevation of a fourth embodiment of a slider of this invention;

FIG. 15 is a partial longitudinal cross-sectional view of the slider taken along the plane of line 15—15 in FIG. 14, showing the connection of the spring to the shaft;

FIG. 16 is a transverse cross-section view of the slider taken along the plane of line 16—16 in FIG. 15, showing the connection of the spring to the shaft; and FIG. 17 is an exploded perspective view of the slider, showing the interconnection of shaft, spring, and crank arm.

Corresponding reference numerals indicate corresponding parts throughout the several views of the drawings.

DETAILED DESCRIPTION OF THE PREFERRED EMBODIMENTS

FIGS. 1–7 show a first embodiment of a slider constructed according to the principles of this invention. This slider is indicated generally as 1 in FIG. 1 and is shown mounted on the body 3 of a vehicle. The slider 1 permits adjustment of the suspension (not shown) of the vehicle longitudinally with respect to the body 3. As illustrated, the vehicle is a trailer in which the body 3 is a van, but it should be understood that the sliders of this invention are not limited to trailers.

Generally, the slider 1 is of the type comprising a pair of side rails 5L, 5R secured to the bottom of the van at the left and right sides of the van in fixed position extending longitudinally of the van. Each side rail is generally Z-shaped in cross section (FIG. 3), having a generally vertical web 7, an upper inwardly directed horizontal flange 9, and a lower outwardly directed flange 11. The slider 1 also includes a rectangular frame, generally designated 15 (FIG. 2), which carries the suspension and comprises left and right slide members 17L and 17R, respectively, and front and rear cross beams 19 and 21, respectively, interconnecting the slide members adjacent their ends. The slide members 17L and 17R are slidable longitudinally of the van on the side rails. As best illustrated in FIG. 3, each slide member is generally of G-shape in transverse cross section, having an upper inwardly-directed horizontal flange 25 spaced below the upper flange 9 of a respective side rail 5L, 5R, a generally vertical sidewall 27 disposed inwardly of the web 7 of the side rail, a lower inwardly directed horizontal flange 29, and a lip 31 bent upwardly from the inner end of the lower flange 29. An upright reinforcing gusset 33 spans the upper flange 25 and lip 31, the end result being that each slide member is a hollow-beam member.

A plurality of hook-shaped sliders 35 affixed to the sidewalls 27 of the slide members overlie the lower flanges 11 of respective side rails 5L, 5R and permit the frame 15 of the slider, carrying the suspension, to be slidably adjusted relative to the side rails. Pads 41 are provided between the upper flange 25 of a slide member and the overlying upper flange 9 of a respective side rail to ensure a relatively close sliding fit between the two members. The cross beams 19, 21 of the frame span the slide members and are affixed (as by welding) to the gusset plates 33.

A plurality of locking pins, each designated 45, are provided for locking the frame 15 in various positions of adjustment relative to the side rails 5L, 5R. Four such pins are illustrated in FIG. 2, two at the front of the slider 1, adjacent opposite slide members 17L and 17R and two at the rear of the slider adjacent the opposite slide members. The pins are supported by mounting plates 47 affixed to the cross beams 19, 21 for horizontal linear movement in a direction generally transverse to the van and are conjointly retractible for permitting adjustment of the frame to various positions of adjustment relative to the side rails and extensible for locking the frame in a selected position of adjustment. As shown in FIG. 3, when a pin 45 is in its extended position it extends through openings 51, 53 in the gusset and sidewall 27 of a respective slide member 17R, 17L, and thence through one of a series of openings 55 in the web 7 of a respective side rail 5L, 5R. The openings 55 are spaced at regular intervals to provide the necessary adjustment. Each pin 45 is biased toward its extended position by means of a spring 57 disposed between the mounting plate 47 and a radial flange 59 around the pin toward its outer end.

The locking pins 45 are conjointly movable between extended and retracted positions by means of linkage generally indicated at 61 interconnecting the pins. The linkage comprises a shaft 67 extending longitudinally of the frame 15 generally parallel to the slide members 17L, 17R and midway therebetween. As illustrated in FIGS. 2 and 4, the shaft 67 is journaled in the cross beams 19, 21 for rotation, as described below. A plurality of links 71, one for each locking pin 45, interconnect shaft 67 and the pins. Thus, as illustrated in FIGS. 2–3 and 6–7, the inner ends of the links interconnecting the two locking pins 45 at the rear of the slider are pivotally connected to opposite ends of plate 73 affixed to shaft 67, and the outer ends of these links 71 are pivotally connected with respective pins 45. Similarly, the inner ends of the links 71 interconnecting the two pins 45 at the front of the slider are pivotally connected to opposite ends of plate 73 affixed to the shaft 67, and the outer ends of these links are pivotally connected with respective pins 45. The pivotal connection between the outer ends of the links 71 and pins 45 may be accomplished by bending the outer end of each link 90°, and securing the bent end in a diametrical hole through the end of a respective pin, as by a cotter pin (not shown). Similarly, the pivotal connection between the inner ends of the links 71 and the plates 73 may be accomplished by bending the inner end of each link 90° and securing the bent end in a respective hole through the plate, as by a cotter pin (not shown). The arrangement is such that rotation of the shaft 67 in one direction effects conjoint retraction of all four locking pins 45 to the position shown in FIG. 7, and rotation of the shaft 67 in the opposite direction effects conjoint extension of the locking pins to the position shown in FIG. 3.

An actuating member in the form of a pull rod 81 is provided for rotating the shaft 67 and thereby effecting articulation of the links 71 to retract the locking pins 45. The pull rod 81 extends generally transversely with respect to the van and laterally outwardly through openings 83 and 85 in the lip 31 and sidewall 27 of the right slide member 17R at the rear of the frame (see FIGS. 3, 6 and 7). The outer end of the rod is bent to form a handle 87 which may be grasped and manually pulled outwardly in the direction of the length of the rod (i.e. transversely of the van) from a first position (FIG. 3) to a second position (FIG. 6 or 7) for effecting articulation of the linkage 61 to retract the locking pins 45 to permit adjustment of the slide and suspension relative to the side rails and van. The pull rod 81 has two sets of notches 91 and 93 formed therein. Each set comprises a pair of notches adapted for receiving edges of the sidewall 27 of the slide member 17R bounding the opening 85 therethrough, which is of keyhole configuration (See FIG. 1). The notches are positioned so that the pull rod 81 may be secured in first and second positions by moving the pull rod 81 to the appropriate position and then dropping the rod in the narrow portion of the keyhole opening 85 so that the edges of the opening are received in a respective set of notches 91 or 93.

The inner end portion of the pull rod 81 is connected to one end of crank arm 101, the other end of which is rotatably mounted on the rearward end of shaft 67. As shown in FIG. 2, the inner end of the pull rod 81 may be bent 90° and secured in a hole in crank arm 101, as with a washer and cotter pin. As shown in FIG. 4, a sleeve 107 is mounted on the rearward end of the shaft 67, and secured thereto as with welds. The upper end of the crank arm 101 is rotatably mounted on the sleeve 107. A tubular spacer 109 is also rotatably mounted on the sleeve 107, and extends between the rearward plate 73 and the crank arm 101. The crank arm 101 is rigidly attached to the spacer 109, as by welds, the arrangement being such that the crank arm and spacer rotate as a unit on the sleeve 107.

A coil spring 111 encircles the spacer 109. The forward end of the spring 111 is bent into a hook 113 which hooks on the arm 73, and the rearward end of the spring 111 is bent into a hook 115 which hooks on the crank arm 101. The spring 111 is arranged so that rotation of crank arm 101 on shaft 67 by the operation of rod 81 torsionally deflects or "winds" the spring 111, thereby applying a turning biasing force on the plate 73 and thus the shaft 67. The arm 101, spacer 109, and spring 111 are retained on sleeve 107 by a retainer plate 117 affixed to the outer end of the sleeve 107, as by welds. The retainer plate 117 has a tab 119 extending forwardly therefrom which is engageable by the crank arm 101 to restrict clockwise rotation of the crank arm (as viewed in FIGS. 3, 6 and 7). The spring 111 preferably applies a relatively small preload to the crank, urging the crank against the tab to hold the crank arm in place and prevent chattering.

The spring 111 is so sized and configured that deflection of the spring requires a force greater than the combined forces exerted by the springs 57 urging the locking pins 45 toward their extended positions. Thus, in circumstances where the locking pins 45 are not stuck or wedged in their extended positions, pulling the pull rod 81 from its first position (FIG. 3) to its second position (FIG. 7) to retract the locking pins will not substantially deflect the spring 111. However, if one or more of the locking pins 45 is stuck, the spring 111 will deflect, permitting movement of the pull rod 81 laterally outwardly to the position shown in FIG. 6, and rotation of the crank arm 101 relative to shaft 67. The pull rod may be locked in this second position while the spring 111 remains deflected thereby to maintain a force urging rotation of the plate 73 and thus shaft 67 to effect articulation of the links 71 to retract the locking pins.

With the pull rod 81 secured in its FIG. 6 position and the spring 111 deflected, the vehicle may be "jogged" to free the locking pins 45, whereupon the force exerted by the deflected spring will be sufficient to effect rotation of plate 73 and shaft 67 to retract all four locking pins 45 so that the longitudinal position of the suspension relative to the van 3 may be adjusted.

FIGS. 8 and 9 show a second embodiment of a slider 201 constructed according to the principles of this invention. This slider is similar to slider 1 except with respect to the interconnection between pull rod 81 and shaft 67, at the rearward end of the shaft 67. The balance of the slider 201 is therefore not described here, and reference should be had to the description of slider 1.

In slider 201, in place of the plate 73 at the rearward end of the shaft 67, two parallel elongate plates 203 and 205 are rigidly attached to the shaft 67, as by welds. The inner ends of the rearward links 71 are secured in opposite ends of these plates 203 and 205 (FIG. 9). A crank arm 207 is rotatably mounted on the shaft 67, between the plates 203 and 205. Indicated at 109 is a coil spring 209, the upper end of which is hooked around a pin 211 extending between the plates 203 and 205 and the lower end of which is hooked through a hole 213 in the crank arm 207, as illustrated in FIG. 8. The pull rod 81 is pivotally attached to the free end of crank arm 207, for example by means of a washer and cotter pin (not shown) in the same manner as the pull rod 81 is attached to the crank arm 101 in slider 1.

The spring 209 is so sized and configured that deflection of the spring requires a force greater than the combined forces exerted by the springs 57 urging the locking pins 45 toward their extended positions. Thus, in circumstances where the locking pins 45 are not stuck or wedged in their extended positions, pulling the pull rod 81 from its first position to its second position to retract the locking pins will not substantially deflect the spring 209. However, if one or more of the locking pins 45 is stuck, as the rod 81 is pulled, the crank arm 207 rotates (counterclockwise as viewed in FIG. 8), and the spring 209 stretches or deflects (shown in phantom in FIG. 8), thereby permitting movement of the pull rod 81 laterally outwardly to its second position and rotation of crank arm 207. The pull rod 81 may be locked in this position while the spring 209 remains deflected thereby to maintain a biasing force urging rotation of the plates 203 and 205 and thus shaft 67 to effect articulation of the links 71 to retract the locking pins.

With the pull rod 81 secured in its second position and the spring 209 deflected, the vehicle may be "jogged" to free the locking pins 45, whereupon the force exerted by the deflected spring will be sufficient to effect rotation of plates 203 and 205 and shaft 67 to retract the pins 45 so that the longitudinal position of the suspension relative to the van 3 may be adjusted (as shown in phantom in FIG. 8).

FIGS. 10-13 show a third embodiment of a slider 301 constructed according to the principles of this invention. This slider is similar to slider 1 except with respect to the interconnection between rod 81 and the shaft 67, at the rearward end of the shaft 67. Thus, the remaining portions of the slider 301 are not described here and reference should be had to the description of slider 1.

In slider 301, the rearward end of the shaft 67, which is illustrated as being a tubular shaft, has a pair of diametrically opposite slots therein extending along the shaft, each slot being designated 303. The slots 303 are adapted to receive one end of an involute band-type torsion spring 305. A bolt 307 extends through the slotted end of the shaft 67 and is secured with a nut 309 to lock the end of the spring 305 in the end of the shaft. The spring 305 comprises a coiled or wound spring section 311 encircling the shaft 67 and a tangential arm section 313. The arm 313 of spring 305 has a hole 315 in it for attachment to the end of pull rod 81'. The pull rod 81' is identical to pull rod 81 except for the provision of a generally z-shaped end section 317 (FIG. 13) for engaging the arm section 313. The z-shaped end section 317 comprises a first lateral offset 319 extending generally at right angles to the pull rod, a center portion 321 extending generally parallel to the pull rod, and a second lateral offset 323 extending generally at right angles to the pull rod. The hole 315 in the end of the arm section 313 enables the arm section to be manipulated over the end of the pull rod 81' to a position between the lateral offsets 319 and 323, so that arm section 313 can be secured on the center portion 321 without a fastener.

The spring 305 is so sized and configured that deflection of the spring requires a force greater than the combined forces exerted by the springs 57 urging the locking pins 45 toward their extended positions. Thus, in circumstances where the locking pins 45 are not stuck or wedged in their extended positions, pulling the pull rod 81' from its first position to its second position to retract the locking pins will not substantially deflect the spring 305. However, if one or more of the locking pins 45 is stuck, as the rod 81' is pulled, the spring 305 "winds" (counterclockwise as viewed in FIG. 11), permitting movement of the pull rod 81' laterally outwardly to the second position, and rotation of arm section 313. The pull rod may be locked in this position while the spring 305 remains deflected thereby to maintain a force urging rotation of the shaft 67 and thus plate 73 to effect articulation of the links 71 to retract the locking pins.

With the pull rod 81' secured in its second position and the spring 305 deflected, the vehicle may be "jogged" to free the locking pins 45, whereupon the force exerted by the deflected spring will be sufficient to effect rotation of shaft 67 and plate 73 to retract all four locking pins 45 so that the longitudinal position of the suspension relative to the van 3 may be adjusted.

FIGS. 14-17 show a fourth embodiment of a slider 401 constructed according to the principles of this invention. This slider is similar to slider 1 except with respect to the interconnection between the pull rod 81 and the shaft 67, at the rearward end of the shaft 67. Thus, the remaining portions of the slider 401 are not described here and reference should be had to the description of slider 1.

In slider 401, one end of a torsion bar type spring 403 is secured inside the tubular shaft 67. The end of the spring 403 may be formed in a roll 405, and attached to the shaft 67 by means of a bolt 407 extending diametrically through shaft 67 and secured with nut 409 (FIG. 16). In place of crank arm 101, slider 401 has a crank arm 411 having a cylindrical cap 413 at one end that is rotatably mounted on the rearward end of the shaft 67. The crank arm 411 has a rectangular slot or keyway 415 for receiving the end of the spring 403. A bolt 417 and nut 419 are secured through a hole 421 in the end of spring 403 to retain the crank arm 411 on the shaft. The pull rod 81 is pivotally secured to the end of the crank arm 411, as by a washer and cotterpin (not shown) in the same manner as the pull rod 81 is attached to the crank arm 101 in slider 1.

The spring 403 is so sized and configured that deflection of the spring requires a force greater than the combined forces exerted by the springs 57 urging the locking pins 45 toward their extended positions. Thus, in circumstances where the locking pins 45 are not stuck or wedged in their extended positions, pulling the pull rod 81' from its first position to its second position to retract the locking pins will not substantially deflect the spring 403. However, if one or more of the locking pins 45 is stuck, as the rod 81 is pulled, the bar spring 403 twists on its axis (counterclockwise as viewed in FIG. 14), permitting movement of the pull rod 81 laterally outwardly to the second position, and the rotation of crank arm 411. The pull rod may be locked in this position while the bar spring 403 remains deflected thereby to maintain a force urging rotation of the shaft 67 and thus arm 73 to effect articulation of the links 71 to retract the locking pins.

With the pull rod 81 secured in its second position and the spring 403 deflected, the vehicle may be "jogged" to free the locking pins 45, whereupon the force exerted by the deflected spring 403 will be sufficient to effect the rotation of shaft 67, and arm 73 to retract all four locking pins 45 so that the longitudinal position of the suspension relative to the van 3 may be adjusted.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A slider for adjustment of the suspension of a vehicle longitudinally with respect to the body of the vehicle, the slider comprising a pair of side rails adapted to be secured at the left and right sides of the body in fixed position extending longitudinally of the body, and a frame adapted to carry the suspension comprising left and right side members slidable longitudinally of the body on the side rails, and a plurality of locking pins for locking the frame in various positions of adjustment relative to the side rails, said locking pins being retractible for permitting adjustment of the frame to a selected position of adjustment and extensible for locking the frame in a selected position of adjustment, wherein the improvement comprises:

means for retracting said locking pins including linkage interconnecting said pins for conjoint movement of the pins between extended and retracted positions, said linkage including shaft means extending longitudinally of the frame, a crank for rotating said shaft means, and a plurality of links interconnecting said shaft means and the locking pins whereby rotation of the shaft means in one direction effects retraction of the locking pins and rotation of the shaft means in the opposite direction effects extension of the locking pins, an actuating member connected to said crank manually movable from a first position to a second position for rotating the crank to rotate the shaft means in said one direction to retract the locking pins, spring means connected at one end to means rigidly secured to said shaft means and connected at its other end to said crank, the arrangement being such that, in the event one or more of the locking pins are stuck in extended position the spring means is adapted to deflect to permit movement of the actuating member from said first position to said second position and rotation of the crank in said one direction while urging rotation of the shaft means to retract the locking pins, and means for securing the actuating member in said second position while said spring means is urging said shaft means to rotate in said one direction.

2. A slider as set forth in claim 1 further comprising a plurality of springs associated with said locking pins for urging the locking pins toward their extended positions, said spring means being so sized and configured that, when substantially undeflected, it exerts a force on said crank sufficient to overcome the combined forces exerted by the springs associated with the locking pins.

3. A slider as set forth in claim 2 wherein said actuating member is in the form of a pull rod mounted to extend generally transversely with respect to the slide members, said pull rod having rod having a handle at one end, constituting its outer end, adapted to grasped and pulled outwardly to move the rod axially from said first position to said second position.

4. A slider as set forth in claim 1 further comprising stop means engageable by said crank for preventing further rotation of the crank in said opposite direction.

5. A slider as set forth in claim 4 wherein the spring means applies a relatively small pre-load to the crank urging said crank in said opposite direction.

6. A slider as set forth in claim 1 wherein said means rigidly secured to said shaft means comprises a plate affixed to the shaft means in a plane extending generally radially with respect to said shaft means.

7. A slider as set forth in claim 6 wherein said plate projects laterally outwardly on opposite sides of said shaft means, and wherein two of said links interconnecting respective locking pins and said shaft means are connected to said plate on opposite sides of the shaft means.

8. A slider as set forth in claim 6 wherein said crank is rigidly attached to a tubular member rotatable on said shaft means, said crank extending radially from said tubular member.

9. A slider as set forth in claim 8 wherein said stop means comprises a stop member affixed to said shaft means engageable by the crank, said tubular member being disposed between said plate and said stop member.

10. A slider as set forth in claim 1 wherein said spring means is a torsion spring.

11. A slider as set forth in claim 1 wherein the crank is rotatably mounted on said shaft means.

12. A slider as set forth in claim 1 wherein the crank is rotatably mounted on the shaft means, and wherein the spring means comprises a coil spring encircling the shaft means connected at one end to the shaft means and at the other end to the crank, so that relative rotation of the crank and the shaft means causes the coil spring to deflect.

13. A slider as set forth in claim 1 wherein said shaft means has a diametrical slot therein, and wherein the spring means comprises an involute band spring, one end of which is secured in the slot in said shaft means, and wherein the crank comprises an elongate integral extension of the band spring, so that relative rotation of the crank and the shaft means causes the band spring to deflect.

14. A slider as set forth in claim 1 wherein the crank is rotatably mounted on the end of said shaft means, wherein the shaft means is hollow, and wherein said spring means comprises a torsion bar inside the shaft means, one end of the torsion bar being connected to the shaft means and the other end being connected to the crank, so that relative rotation between the crank and the shaft means causes the torsion bar to deflect.

15. A slider as set forth in claim 1 wherein the crank is rotatably mounted on the shaft, and wherein the spring means comprises a tension spring connected at one end to means rigidly connected to said shaft means and at its other end to the remote end of the crank, so that relative rotation between the crank and the shaft means causes the tension spring to deflect.

16. A slider as set forth in claim 15 wherein the tension spring is a coil spring.

17. A slider for adjustment of the suspension of a vehicle longitudinally with respect to the body of the vehicle, comprising a pair of side rails adapted to be secured at the left and right sides of the body in fixed position extending longitudinally of the body, and a frame adapted to carry the suspension comprising left and right side members slidable longitudinally of the body on the side rails, and a plurality of locking pins for locking the frame in various positions of adjustment relative to the side rails, said locking pins being retractible for permitting adjustment of the frame to a selected position of adjustment and extensible for locking the frame in a selected position of adjustment, wherein the improvement comprises:

means for retracting said locking pins including linkage interconnecting said pins for conjoint movement of the pins between extended and retracted positions, said linkage including shaft means extending longitudinally of the frame, a crank for rotating said shaft means, and a plurality of links interconnecting said shaft means and the locking pins whereby rotation of the shaft in one direction effects retraction of the locking pins and rotation of the shaft in the opposite direction effects extension of the locking pins, an actuating member connected to said crank adapted to be pulled from a first position to a second position for rotating the crank to rotate the shaft means in said one direction to retract the locking pins, a tension spring connected at one end to the crank and at the other end to the shaft means, the arrangement being such that, in the event one or more of the locking pins are stuck in extended position when the actuating member is pulled to rotate the crank in said one direction, the tension spring is adapted to deflect to permit rotation of the crank and movement of the actuating member from said first position to said second position while urging rotation of the shaft means in said one direction to retract the locking pins, and means for securing the actuating member in said second position while said tension spring is urging said shaft means to rotate in said one direction.

18. A slider as set forth in claim 17 further comprising a plurality of springs associated with said locking pins for urging the locking pins toward their extended positions, said tension spring being so sized and configured that, when deflected, it exerts a force on said crank arm sufficiently great to overcome the combined forces exerted by the springs associated with the locking pins.

19. A slider as set forth in claim 18 wherein said actuating member is in the form of a pull rod mounted to extend generally transversely with respect to the slide members, said pull rod having a handle at one end, constituting its outer end, adapted to grasped and pulled outwardly to move the rod axially from said first position to said second position.

* * * * *